(12) United States Patent
Grenholm et al.

(10) Patent No.: US 7,080,213 B2
(45) Date of Patent: Jul. 18, 2006

(54) SYSTEM AND METHOD FOR REDUCING SHARED MEMORY WRITE OVERHEAD IN MULTIPROCESSOR SYSTEMS

(75) Inventors: Oskar Grenholm, Uppsala (SE); Zoran Radovic, Uppsala (SE); Erik E. Hagersten, Uppsala (SE)

(73) Assignee: Sun Microsystems, Inc., Santa Clara, CA (US)

( * ) Notice: Subject to any disclaimer, the term of this patent is extended or adjusted under 35 U.S.C. 154(b) by 321 days.

(21) Appl. No.: 10/320,758

(22) Filed: Dec. 16, 2002

(65) Prior Publication Data

US 2004/0117564 A1    Jun. 17, 2004

(51) Int. Cl.
*G06F 12/00* (2006.01)

(52) U.S. Cl. .......................... 711/141; 711/128; 711/3; 711/155; 711/119; 711/113; 711/118; 709/216; 710/200

(58) Field of Classification Search ................ 711/141, 711/128, 3, 155, 119, 130; 709/216; 710/200
See application file for complete search history.

(56) References Cited

U.S. PATENT DOCUMENTS

| | | | | |
|---|---|---|---|---|
| 5,392,433 A | * | 2/1995 | Hammersley et al. | ...... 710/200 |
| 5,749,095 A | * | 5/1998 | Hagersten | .................... 711/141 |
| 5,758,183 A | | 5/1998 | Scales | |
| 5,761,729 A | | 6/1998 | Scales | |
| 5,787,480 A | | 7/1998 | Scales et al. | |
| 5,802,585 A | | 9/1998 | Scales et al. | |
| 5,933,598 A | | 8/1999 | Scales et al. | |
| 5,950,228 A | | 9/1999 | Scales et al. | |
| 5,964,835 A | * | 10/1999 | Fowler et al. | ............... 709/216 |
| 6,055,605 A | | 4/2000 | Sharma et al. | |
| 6,085,263 A | | 7/2000 | Sharma et al. | |
| 6,088,769 A | * | 7/2000 | Luick et al. | ................. 711/141 |
| 6,088,771 A | | 7/2000 | Steely, Jr. et al. | |
| 6,275,907 B1 | * | 8/2001 | Baumgartner et al. | ....... 711/143 |
| 6,374,285 B1 | | 4/2002 | Scales et al. | |
| 6,438,653 B1 | * | 8/2002 | Akashi et al. | ............... 711/128 |
| 6,785,774 B1 | * | 8/2004 | Arimilli et al. | .............. 711/141 |
| 2001/0037435 A1 | * | 11/2001 | Van Doren | .................. 711/153 |

* cited by examiner

*Primary Examiner*—Mano Padmanabhan
*Assistant Examiner*—Mardochee Chery
(74) *Attorney, Agent, or Firm*—Meyertons Hood Kivlin Kowert & Goetzel, P.C.; B. Noël Kivlin

(57) ABSTRACT

A system and method for reducing shared memory write overhead in multiprocessor system. In one embodiment, a multiprocessing system implements a method comprising storing an indication of obtained store permission corresponding to a particular address in a store buffer. The indication may be, for example, the address of a cache line for which a write permission has been obtained. Obtaining the write permission may include locking and modifying an MTAG or other coherence state entry. The method further comprises determining whether the indication of obtained store permission corresponds to an address of a write operation to be performed. In response to the indication corresponding to the address of the write operation to be performed, the write operation is performed without invoking corresponding global coherence operations.

40 Claims, 7 Drawing Sheets

SYSTEM AND METHOD FOR REDUCING SHARED MEMORY WRITE OVERHEAD IN MULTIPROCESSOR SYSTEMS

BACKGROUND OF THE INVENTION

1. Field of the Invention

This invention relates to the field of multiprocessor computer systems and, more particularly, to mechanisms and methods for optimizing shared memory write operations within multiprocessor computer systems.

2. Description of the Related Art

A popular architecture in commercial multiprocessing computer systems is a distributed shared memory architecture. A distributed shared memory architecture includes multiple nodes within which processors and memory reside. The multiple nodes communicate via a network coupled between them. When considered as a whole, the memory included within the multiple nodes forms the shared memory for the computer system.

Distributed shared memory systems are scaleable, overcoming various limitations associated with shared bus architectures. Since many of the processor accesses are completed within a node, nodes typically have much lower bandwidth requirements upon the network in comparison to the bandwidth requirements a shared bus architecture must provide upon its shared bus to attain comparable performance. The nodes may operate at high clock frequency and bandwidth, accessing the network when needed. Additional nodes may be added to the network without affecting the local bandwidth of the nodes. Instead, only the network bandwidth is affected.

One complication associated with distributed memory in multiprocessing computer systems relates to maintaining the coherency of program data shared across multiple nodes. In general, the system may implement an ordering policy that defines an order of operations initiated by different sources. During the execution of a system's workload, cache lines may often move between various system nodes. This movement needs to be performed such that operations on the cache lines occur in a manner that is consistent with the ordering model. Without a coordination mechanism, one node may perform an update that is not properly reflected in another node. Maintaining a unified, coherent view of shared memory locations is thus essential from the standpoint of program correctness.

One technique for handling coherence in shared memory systems employs hardware interfaces between nodes that track the coherency state of each cache line and perform coherence operations depending upon desired operations. Typically, the coherency state of each cache line is tracked in a directory structure. When a processor initiates a write to a particular cache line, if the node in which the processor resides does not already have a write access right to the cache line, the hardware interfaces may respond by invoking coherence operations to provide the requesting node with an exclusive, writable copy of the data. These coherence operations may include functionality to cause the owner of the cache line to provide the cache line to the requesting node, and functionality to cause shared copies of the cache line in other nodes to be invalidated before allowing the requesting node to commence the write operation.

Similarly, when a processor initiates a read from a particular cache line, if the node in which the processor resides does not already have a read access right to the line, the hardware interfaces may respond by invoking coherence operations to provide the requesting node with a shared copy of the data. Typically, this involves causing the owner of the cache line to provide the cache line to the requesting node.

Other techniques for handling coherence in shared memory systems employ software methodologies that perform functions similar to those of the hardware interfaces described above. More particularly, prior to performing an operation on a given line, the software may be configured to access a directory entry corresponding to the cache line and to perform corresponding coherence operations similar to those discussed in the hardware context above. In some implementations, other data structures such as MTAGs may also be maintained that indicate access rights to cache lines stored within each node. The MTAG for a given cache line may be accessed to determine whether coherence operations to carry out a given operation are necessary.

To avoid race conditions, the directory and/or MTAG entries may be "locked" via atomic operations. The locking of the directory and/or MTAG entries prevents other processors or nodes from modifying the entries and performing coherence operations with respect to a cache line that is already being operated upon by a processor that has acquired the lock. Thus, possessing a lock on the directory and/or MTAG entry may be a necessary precondition for performing a given operation (e.g., a store and/or a load) on a cache line. After performing the operation on the cache line or coherence operations relating thereto, the processor may release the lock, thereby allowing another processor to acquire the lock.

The atomic operations required to obtain a lock include both load and store sub-operations that must be performed. Unfortunately, these lock acquisition functions can add significant latency, thus degrading overall system performance. In addition, if a cache line is alternatively written to by processors of different nodes, frequent migration of the cache line and the corresponding locks may further result, thus also limiting overall system performance.

SUMMARY OF THE INVENTION

A system and method for reducing shared memory write overhead in multiprocessor systems is disclosed. In one embodiment, a multiprocessing system implements a method comprising storing an indication of obtained store permission corresponding to a particular address in a store buffer. The indication may be, for example, the address of a cache line for which a write permission has been obtained. Obtaining the write permission may include locking and modifying an MTAG or other coherence state entry. The method further comprises determining whether the indication of obtained store permission corresponds to an address of a write operation to be performed. In response to the indication corresponding to the address of the write operation to be performed, the write operation is performed without invoking corresponding global coherence operations.

Figure 1:
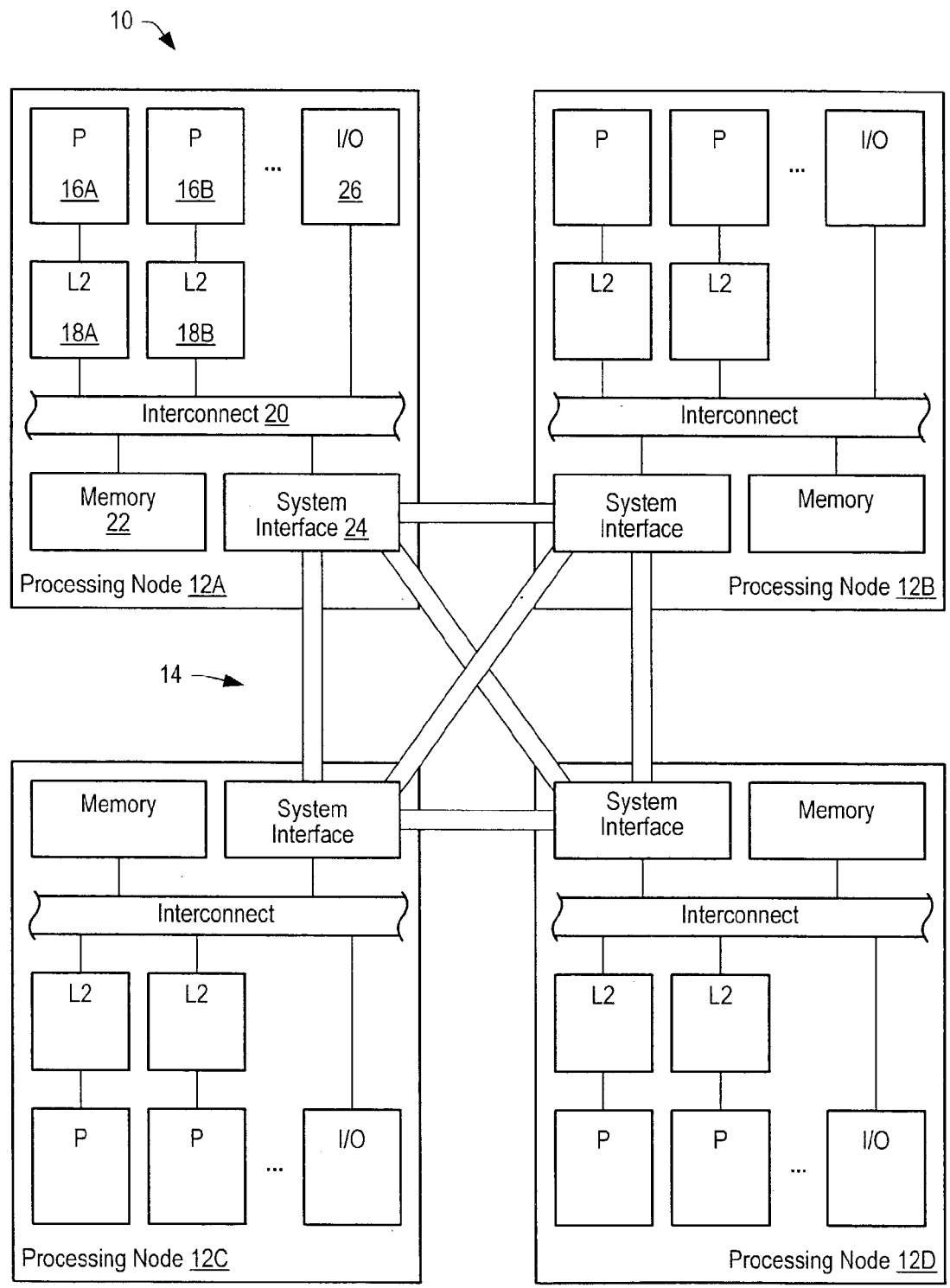
FIG. 1 is a block diagram of one embodiment of a multiprocessing computer system 10.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Turning now to FIG. 1, a block diagram of one embodiment of a multiprocessing computer system 10 is shown. Computer system 10 includes multiple processing nodes 12A–12D interconnected by a point-to-point network 14. Elements referred to herein with a particular reference number followed by a letter will be collectively referred to by the reference number alone. For example, processing nodes 12A–12D will be collectively referred to as processing nodes 12. In the embodiment shown, each processing node 12 includes multiple processors, caches, a memory, and a system interface. For example, processing node 12A is configured with multiple processors including processors 16A–16B. The processors 16 are connected to caches 18, which are further coupled to a node interconnect 20. Additionally, a memory 22 and a system interface 24 are coupled to node interconnect 20. Still further, one or more input/output (I/O) interfaces 26 may be coupled to node interconnect 20. I/O interfaces 26 are used to interface to peripheral devices such as serial and parallel ports, disk drives, modems, printers, etc. Other processing nodes 12B–12D may be configured similarly.

Each processing node 12 is a processing node having memory 22 as the shared memory. Processors 16 are high performance processors. In one embodiment, each processor 16 may employ an ultraSPARC™ processor architecture. It is noted, however, that any processor architecture may be employed by processors 16.

Typically, processors 16 may include internal instruction and data caches. Therefore, caches 18 are labeled as L2 caches (for level 2, wherein the internal caches are level 1 caches). If processors 16 are not configured with internal caches, then external caches 18 are level 1 caches. It is noted that the "level" nomenclature is used to identify proximity of a particular cache to the processing core within processor 16. Level 1 is nearest the processing core, level 2 is next nearest, etc. Caches 18 provide rapid access to memory addresses frequently accessed by the processor 16 coupled thereto. It is noted that external caches 18 may be configured in any of a variety of specific cache arrangements. For example, set-associative or direct-mapped configurations may be employed by external caches 18. It is noted that in some embodiments, the processors 16 and caches 18 of a node may be incorporated together on a single integrated circuit in a chip multiprocessor (CMP) configuration.

Node interconnect 20 accommodates communication between processors 16 (e.g., through caches 18), memory 22, system interface 24, and I/O interface 26. In one embodiment, node interconnect 20 includes an address bus and related control signals, as well as a data bus and related control signals. Because the address and data buses are separate, a split-transaction bus protocol may be employed upon node interconnect 20. Generally speaking, a split-transaction bus protocol is a protocol in which a transaction occurring upon the address bus may differ from a concurrent transaction occurring upon the data bus. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag.

In alternative embodiments, node interconnect 20 may be implemented as a circuit-switched network or a packet-switched network. In embodiments where node interconnect 20 is a packet-switched network, packets may be sent through the data network using techniques such as wormhole, store and forward, or virtual cut-through. In a circuit-switched network, a particular device may communicate directly with a second device via a dedicated point-to-point link that may be established through a switched interconnect mechanism. To communicate with a different device, a different link is established through the switched interconnect. In some embodiments, separate address and data networks may be employed.

Memory 22 is configured to store data and instruction code for use by processors 16. Memory 22 preferably comprises dynamic random access memory (DRAM), although any type of memory may be used. Memory 22, in conjunction with similar illustrated memories in the other processing nodes 12, forms a distributed shared memory system. Each address in the address space of the distributed shared memory is assigned to a particular node, referred to as the home node of the address. A system interface 24 may receive transactions through node interconnect 20 which require a data transfer to or from another processing node 12. System interface 24 performs the transfer, and provides the corresponding data for the transaction upon node interconnect 20, if appropriate. In the embodiment shown, system interface 24 is coupled to a point-to-point network 14. However, it is noted that in alternative embodiments other interconnect structures may be used.

As will be described in further detail below, computer system 10 supports both read and write operations with respect to shared memory. More particularly, a processor of a given node may perform read or write operations on cache lines having remote home nodes. Since multiple nodes may cache a particular cache line, a directory structure is used to track the state of the cache line in each of the different nodes. In one embodiment, the directory includes an entry for each cache line. Each directory entry may include information that identifies the nodes which contain copies of the cache line. Each directory entry may contain additional coherence information, as desired, such as an indication of the owner of the cache line, and/or the access right associated with the cache line within each node.

In addition to the directory structure, in one embodiment each node also maintains a set of MTAG entries which indicate the current access rights to all cache lines stored within that node. In one embodiment, the MTAG entry for each cache line indicates whether the node has a write access right to the cache line. In other embodiments, each MTAG entry may additionally indicate whether the node has a read access right to the cache line.

Figure 2:
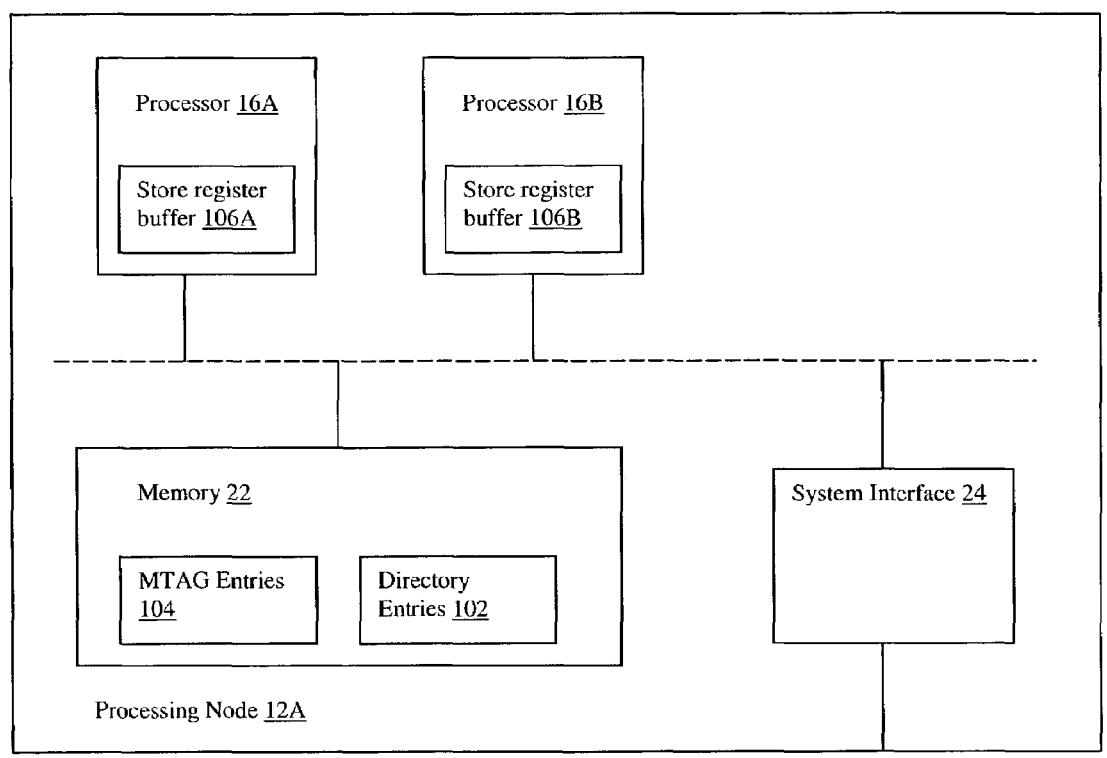
FIG. 2 is a block diagram that illustrates aspects of an embodiment of a processing node.

FIG. 2 illustrates aspects of an embodiment of a processing node 12 wherein directory entries 102 and MTAG entries 104 are stored within memory 22. It is noted that in one embodiment, the directory entries 102 of a given node include an entry for each cache line for which that node is the home node. As such, the directory entries for all of the shared memory of the computer system may be distributed across different nodes. It is also noted that other embodiments are possible wherein the directory entries 202 and/or MTAG entries 204 are stored in storage subsystems other than the memory 22 of each node.

FIG. 2 also illustrates a store register buffer 106A associated with processor 16A and a store register buffer 106B associated with processor 16B. The use of these store buffer registers will also be described further below.

Both the directory and MTAG entries described above may be accessed and modified to control coherence activities for a given cache line. To avoid race conditions the directory and MTAG entries may be locked by a given processor to prevent other processors from concurrently performing certain operations relating to the cache line. A processor may thus obtain store permission for a particular cache line by locking the MTAG and/or directory entry associated with that cache line and performing associate coherence operations, depending on the embodiment.

In one embodiment the directory and MTAG entries may be locked by an atomic test-and-set operation. The test-and-set operation determines whether a lock bit (or lock field) associated with the directory or MTAG entry is cleared (indicating the entry is not currently locked) and atomically sets the lock bit if the lock bit is clear. Otherwise, an indication that the lock is currently held by another processor (or node) is returned. Other possible implementations may use compare-and-swap atomic operations, or non-atomic operations such as load-linked store-conditional operations. The lock field associated with the directory or MTAG entry may also indicate other information about the lock, such as which of several nodes currently holds the lock.

Figure 3:
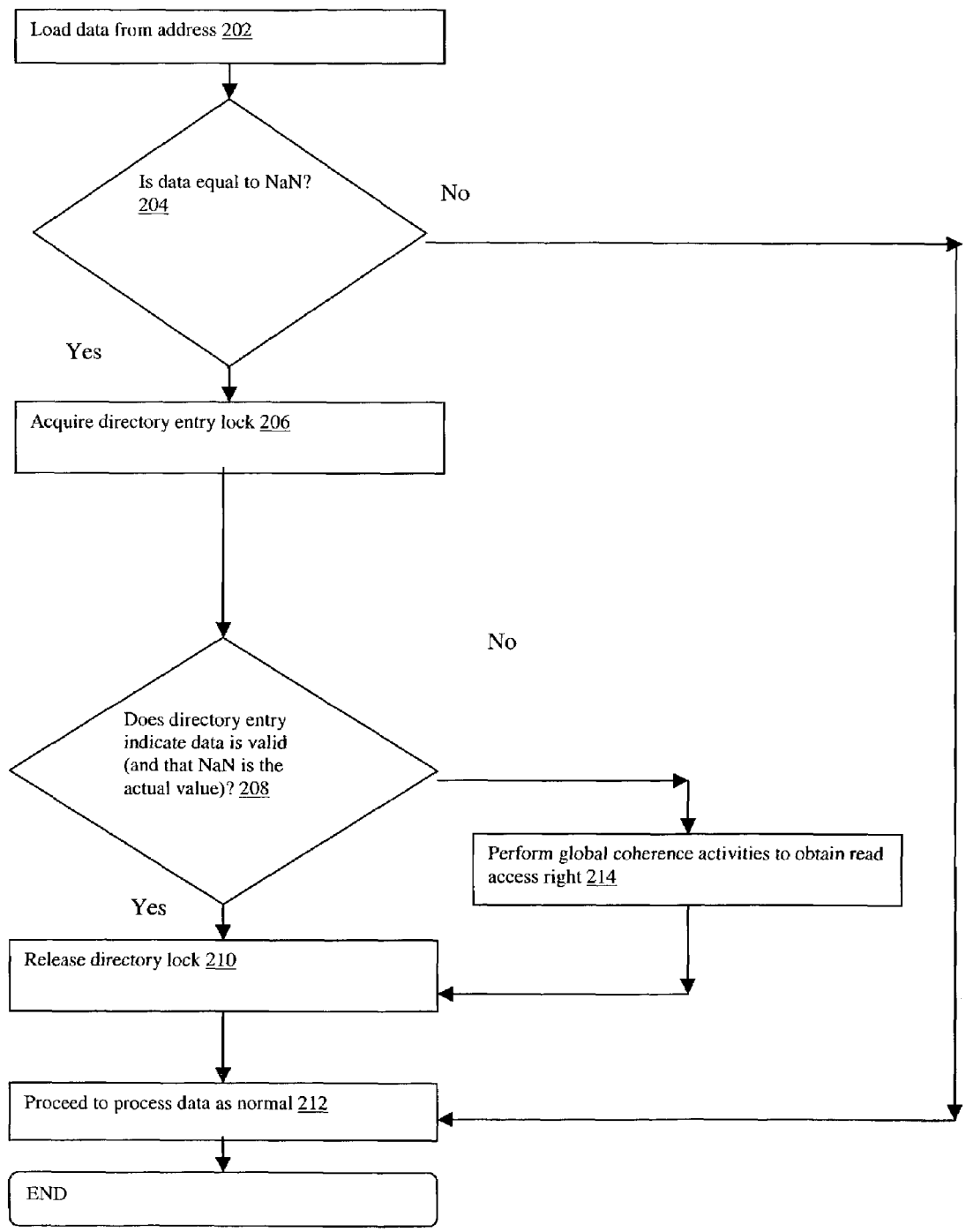
FIG. 3 is a flow diagram depicting operations associated with a cache line read.

FIG. 3 is a flow diagram illustrating a cache line read operation in one embodiment of computer system 10. As shown in step 202, a thread (e.g. embedded in code stored in memory 22) executing in a processor 16 may execute an instruction to load data from a particular address. In step 204 the processor compares the loaded data to a special value referred to as "Not a Number" (NaN). If the data is not equal to NaN, then the processor may process the data in step 212 without further coherence activity.

It is noted that in this embodiment the special value NaN is a designated value that may be used in the coherence protocol to indicate that the cache line may be invalid. A processor performing coherence functionality may write the NaN value to a given cache line to indicate that the cache line is invalid, as described below.

If in step 204 it is instead determined that the cache line value equals NaN, the method proceeds to step 206. In step 206, the processor 16 performs an operation (or operations) to acquire a lock on the directory entry corresponding to the cache line, spinning on the lock if the lock is not immediately available. When the lock is acquired, if the directory entry indicates that the cache line within the node is in a valid, readable state, then the value read is a legitimate value, and no further coherence activity is necessary. The processor releases the directory lock in step 210, and proceeds to process the loaded data, as desired, in step 212. It is noted that in this situation, although the value contained in the cache line coincidentally equaled the special value NaN, the line is in fact not invalid, and thus may be used to complete the load operation in a normal manner without further global coherence activity.

If in step 208 the directory entry indicates that the cache line is invalid (i.e., the node does not contain a readable copy of the cache line), then the processor proceeds to step 214, in which global coherence functions are performed to provide a shared, readable copy of the cache line to the requesting node. More particularly, in one embodiment the processor 16 executes one or more instructions to transfer a copy of the cache line from the owning node to the local node (i.e. the node in which processor 16 resides). The processor 16 may additionally execute one or more instructions to modify the directory entry to indicate that the local node now possesses a readable copy of the data, and to unlock the directory entry. It is noted that, depending on the state of the cache line (e.g. as indicated by the directory entry), the processor 16 may additionally be required to execute one or more instructions to modify the corresponding MTAG entry in the owning node. Following the global coherence functions performed in step 214, the processor 16 can complete the load operation on the data in step 212.

The following is an exemplary code sequence which may be used to implement aspects of the functionality depicted in FIG. 3:

```
1:   ld       [address], %reg         // original LOAD
2:   fcmps    %fcc0, %reg, %reg       // compare reg with itself
3:   fbe, pt  %fcc0, hit              // if (reg == reg) goto hit
4:   nop
5:   // Call global coherence load protocol
hit: ...
```

Figure 4:
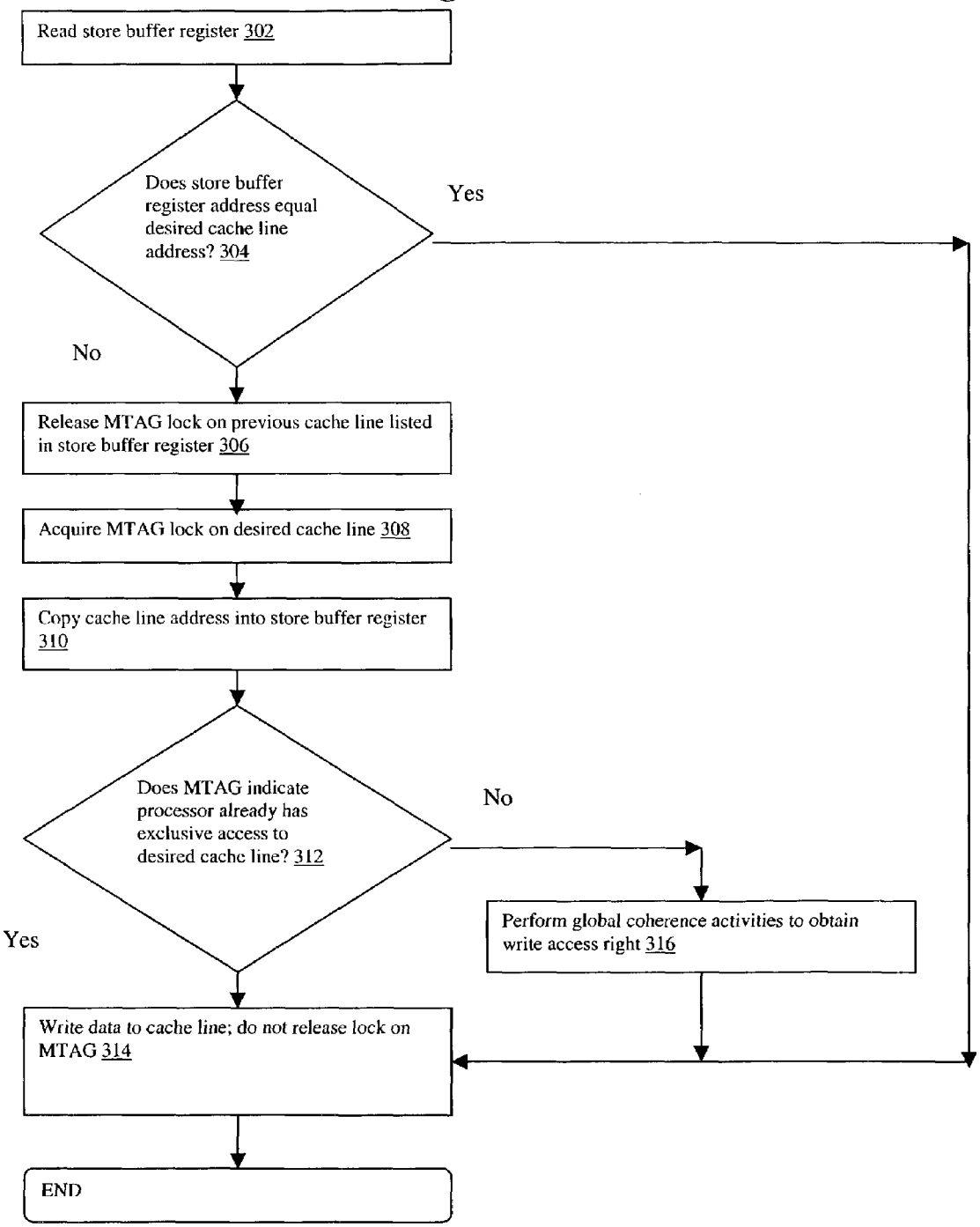
FIG. 4 is a flow diagram depicting operations associated with a cache line write.

FIG. 4 is a flow diagram illustrating functionality associated with a cache line store operation in one embodiment of computer system 10. In step 302 a processor 16 reads an address stored in the store buffer register 106 associated with that processor. In one embodiment, the store buffer register 106 stores an indication of the cache line most recently written to by the processor. As described below, this also serves as an indication that the processor has already acquired a lock on the MTAG entry corresponding to that cache line, and that the node has a write access write to the line.

After reading the address stored in the store buffer register 106, the processor proceeds to step 304, where it compares the address in the store buffer register 106 to the target address of the cache line to be written to. If the addresses match, then the processor writes to the cache line in step 314 without performing further coherence activity. It is noted that in this embodiment following the write operation, the lock on the MTAG entry is not immediately released.

If the target cache line address and the address stored in the store buffer register 106 do not match, the processor executes one or more instructions in step 306 to release the lock on the MTAG entry corresponding to the cache line address stored in the store buffer register 106. The processor 16 then attempts to acquire a lock on the MTAG entry associated with the target cache line address within the local node, spinning on the lock until it is available, if necessary. Once the lock on the MTAG entry corresponding to the target cache line address is acquired, the processor stores the value of the target cache line address into the store buffer register 206 in step 310, and proceeds to step 312.

In step 312, the processor 16 determines whether the MTAG corresponding to the target cache line indicates that the node has a write access right to the cache line. If the node has a write access right to the cache line, then the processor may proceed to step 314, in which the store operation on the line is performed. If the MTAG indicates that the cache line is not writable, then the processor proceeds to step 316. In step 316, the processor 16 executes instructions that implement global coherence operations to cause an exclusive, writable copy of the target cache line to be provided to the local node from the owning node. Details regarding one implementation of these global operations are described below in conjunction with FIG. 5. After a writable copy of the cache line is provided to the local node, the processor 16 completes the store operation in step 314. It is again noted that, following completion of the store operation in step 314, the processor 16 does not immediately release the lock on the MTAG entry.

The following is an exemplary code sequence which may be used to implement aspects of the functionality depicted in FIG. 4:

```
1:  %temp_reg = address        //save the address to %temp_reg
2:  MTAG_id = %remp_reg / CACHE_LINE_SIZE
3:  %temp_reg = %temp_reg - MTAG_id
4:  brnz,pt %temp_reg, slowpath // if (%temp_reg != 0) goto
                                              slowpath
5:  nop
6:  st [address], %reg         //original store
slowpath:
    unlock mtag_lock [%Sbreg]
    lock mtag_lock [address]
    %Sbreg := address
    if mtag [address] != writable
        //Call global coherence store protocol
```

Figure 5:
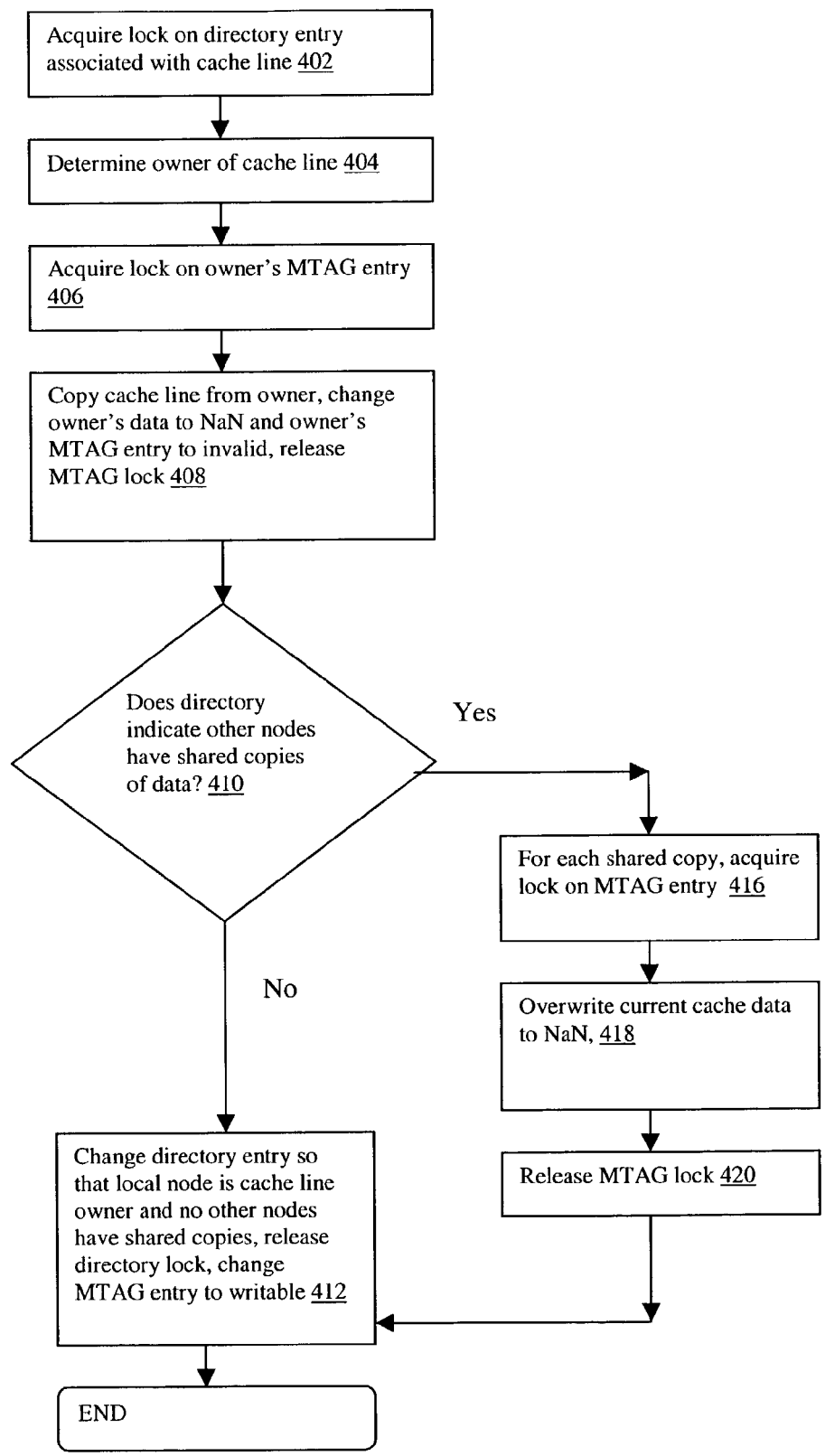
FIG. 5 is flow diagram illustrating an exemplary global coherence operations.

FIG. 5 illustrates one embodiment of the global coherence operations that may be executed in step 316 to transfer a writable copy of a cache line into a requesting node. In step 402, processor 16 executes one or more instructions to acquire a lock on the directory entry associated with the target cache line address, spinning on the lock if it is unavailable. In step 404, after the directory lock is acquired, the processor determines the owner of the cache line from the directory entry.

In step 406, the processor 16 acquires a lock on the MTAG entry associated with the owning node's copy of the cache line. In step 408, the processor 16 executes one or more instructions to transfer the cache line from the owning node into the local node. In addition, the processor 16 may cause the cache line in the sending node to be invalidated by writing the NaN value to the cache line location in the sending node. Still further, the processor 16 may update the sending node's MTAG entry to indicate the cache line has been invalidated and then the release lock.

In step 410, the processor 16 determines from the directory entry if nodes other than the owning node possess a valid copy of the cache line. If other nodes contain a valid copy of the cache line, the processor 16 acquires corresponding the MTAG locks associated with those nodes in step 416. In addition, and similar to the foregoing, in step 418 the processor 16 also causes the cache line to be invalidated in those nodes by writing the NaN value, and changing the respective MTAG entries to indicate the cache line has been invalidated. In step 420, the processor 16 releases the MTAG locks acquired in step 416.

In step 412, the processor 16 changes the directory entry to indicate that a valid copy of the cache line now exists in the local node and that the cache line has been invalidated in all remote nodes. In addition, the directory entry may also be updated, if appropriate, to indicate that the local node is now the owner of the cache line. The processor 16 subsequently releases the directory entry lock.

Still further, in step 412, the processor 16 also updates the MTAG entry in the local node to indicate that the node has a write access right to the cache line. It is noted that since the MTAG entry is locked, other processors cannot change this write access right until the lock on the MTAG entry is released.

Figure 6:
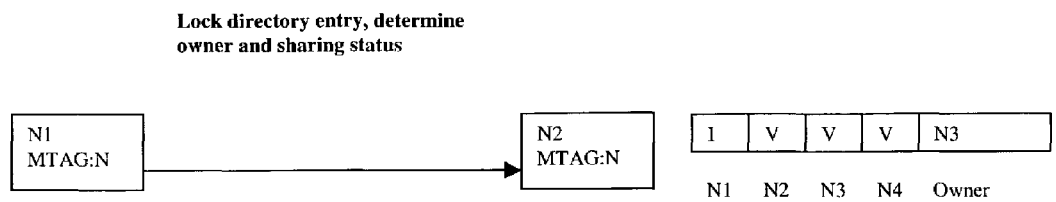
FIGS. 6–9 illustrate exemplary global coherence operations in one embodiment.

The global coherence operations of FIG. 5 may be better understood with reference to the exemplary situation illustrated in FIGS. 6–9. As illustrated in FIG. 6, consider the situation in which a Node 1 (N1) desires a write access right to a particular cache line, Node 2 (N2) possesses both the directory entry corresponding to the cache line and a shared copy of the cache line, Node 3 (N3) owns the cache line, and Node 4 (N4) possesses a shared copy of the cache line. Thus, node N1 first performs an operation to lock the directory entry located in node N2.

Figure 7:
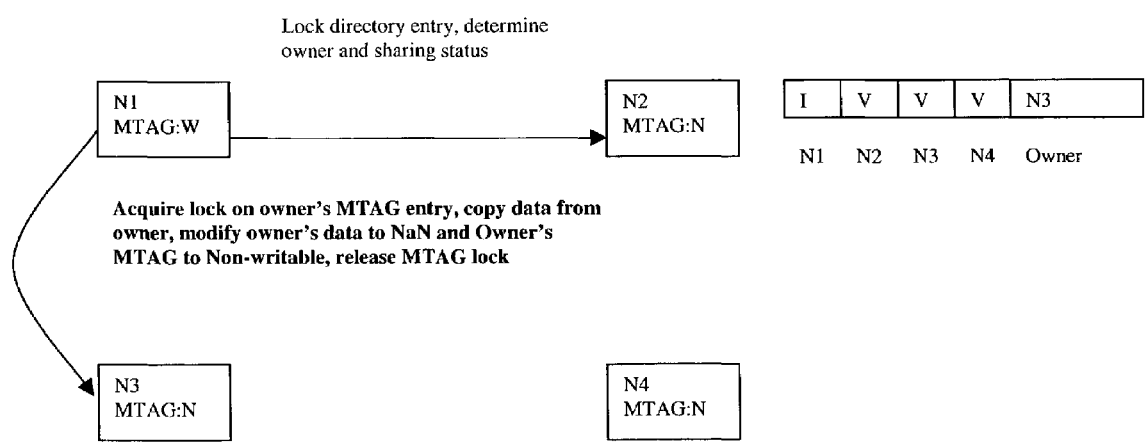

As illustrated in FIG. 7, N1 then acquires a lock on the corresponding MTAG entry of node N3, the owner of the cache line. After obtaining the lock, N1 then transfers the cache line from N3 to N1. After the transfer is complete N1 invalidates the cache line residing in N3 by changing the cache line value to NaN. Finally, N1 releases the lock on N3's MTAG entry.

Figure 8:
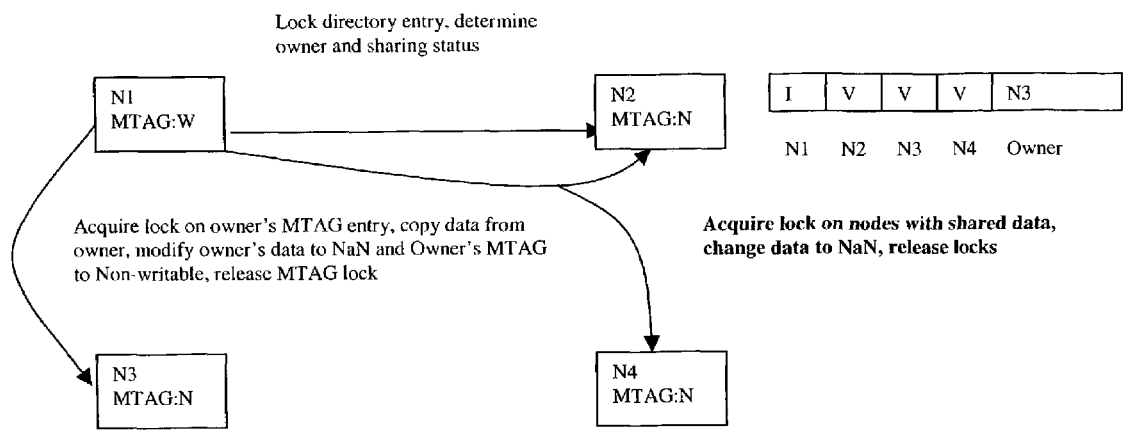

As illustrated in FIG. 8, N1 further acquires locks on the corresponding MTAG entries in nodes N2 and N4, which possess a shared copy of the cache line. N1 then writes the NaN value to the cache line locations in these nodes to invalidate the lines. N1 subsequently releases the MTAG locks on N2 and N4.

Figure 9:
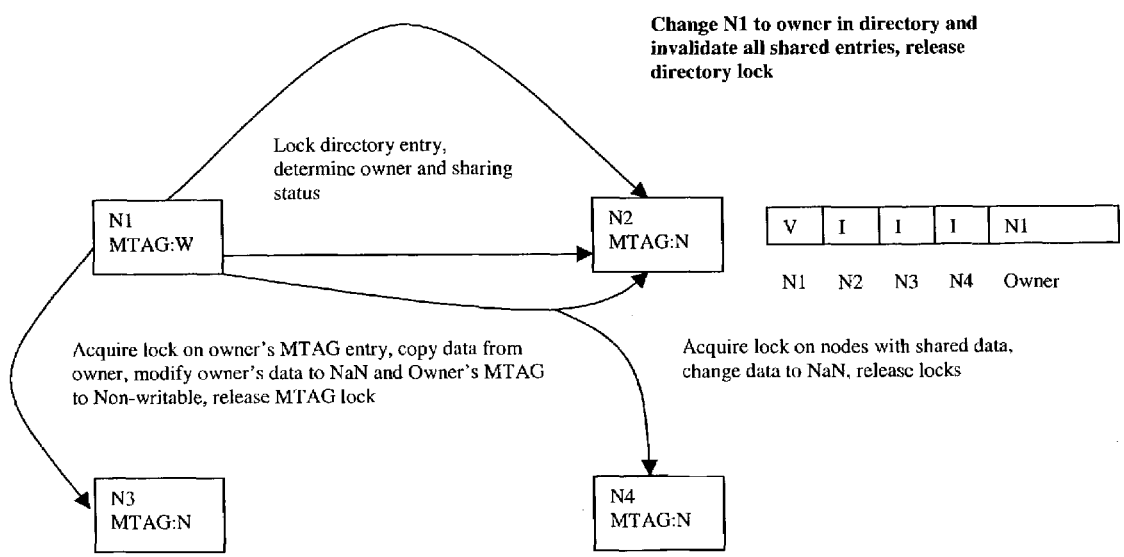

Finally, as illustrated in FIG. 9, N1 modifies the directory entry corresponding to the cache line to indicate that the only valid copy of the cache line now resides in node N1, and further to indicate that N1 is the owner of the cache line. The MTAG entry corresponding to the cache line in N1 is further updated to indicate that a write access right. The directory entry lock is then released.

It is noted that a thread executing in a processor 16 that obtains a lock on the MTAG entry corresponding to a given cache line may be required to release the lock on a periodic basis to avoid deadlock. More specifically, the thread may be required to release the lock in response to certain events, such as a synchronization operation, or at the end of a predetermined time period.

In accordance with the foregoing description, since a processor 16 that performs a write to a given cache line retains a lock on the MTAG entry associated with that cache line (as indicated by the corresponding store buffer register), the processor need not reacquire the lock during subsequent writes to that cache line. Accordingly, a decrease in the migration of the lock and corresponding cache line may further result, and improved system performance may be attained.

In another embodiment, rather than retaining a lock on an MTAG entry which indicates access rights to a corresponding cache line in the node, a lock may instead be retained on the directory entry corresponding to the cache line. Thus, in such an embodiment, when a processor intends to perform a write operation, the processor first examines the store buffer register to determine if the processor already maintains a directory lock on the directory entry associated with the target cache line. If not, the processor obtains a lock on the corresponding directory entry. If global coherence operations are then required to obtain a writable copy of the cache line, such operations are performed. After the processor completes the store operation, it maintains the lock on the associated directory entry, as well as an indication of the retained lock in the store buffer register. It is noted that in such embodiments, MTAGs may not be employed.

As herein, both MTAG entries and directory entries as described above are referred to generally as coherence state entries. Other embodiments with other forms of coherence state entries (that indicate coherence states for corresponding cache lines) may also be possible.

In addition, it is noted that while in the embodiments described above, cache lines may be invalidated by using the special NaN value, other embodiments are possible wherein invalidations are indicated in other ways. For example, in an alternative embodiment, the MTAG entry associated with a cache line is used to indicate the invalidation of a cache line. In yet another embodiment, the directory entry associated with a cache line is used to indicate the invalidation of the cache line.

Furthermore, it is noted that the store buffer register in one embodiment may be a dedicated register within processor 16, while in other embodiments it may be a general purpose register. In addition, while in the embodiment described above, the store buffer register is implemented within processor 16, alternative embodiments are also possible wherein the store buffer is implemented in other locations. For example, a memory location within memory 22 may be provided as a store buffer to store an indication of obtained store permission. It is also noted that multiple processors within a given node may share a common store buffer.

In addition, it is also contemplated that while in the embodiments described above, the store buffer register contains the address of the cache line most recently written by the associated processor 16, other embodiments are possible wherein the address stored is not the most recently written cache line. For example, in an alternative embodiment, the store buffer register may store a cache line address that has a high probability of being written to (and for which store permission has been retained).

In another embodiment, processor 16 may maintain multiple indication of obtained store permission, thereby indicating write access rights to multiple cache lines. In such an implementation, multiple store buffer registers may be employed. When a write operation is performed, the cache line address to be written may be compared to the value in each of the store buffer registers.

In yet another embodiment, the address in each store buffer register may be associated with an area of memory larger than a cache line, depending on the memory architecture of the underlying hardware.

It is also noted that a store buffer register mechanism described above may also be implemented in systems that employ update-based protocols rather than invalidate protocols. In an update-based protocol, a cache line modification by a processor will cause update messages to be sent out to other processors within the system, indicating that any other copies of the modified cache line must be updated to a new value. The use of a store buffer register as described above may allow the number of update messages to be reduced by allowing multiple consecutive updates to be consolidated into a single update message.

For example, a processor may obtain a write access right to a cache line by locking a directory structure. The processor then makes a modification to the local copy of the cache line and writes the address of the cache line to the store buffer register. However, the processor does not send out update messages to other processors in the system. Upon the processor's next write to a cache line, the processor compares the address of the cache line to be written with the address in store buffer register. If the addresses match, the processor once more makes a modification to the local copy of the cache line, but does not send out update messages to other processors. If upon a subsequent write the store buffer register does not match the address of the cache line to be written, the processor changes the address in the store buffer register and sends update messages (global coherence operations) to other nodes in the system. In the event of a mismatch, the processor may also release the lock on the directory structure, giving up the write access right to the cache line. Thus, the processor may update a cache line multiple times but only send one update message, thereby limiting network traffic and improving system performance.

It is also finally noted that the specific global coherence operations described above to obtain a write access right to a cache line may vary depending upon the system. In addition, the order in which the operations depicted in FIG. 5 are performed may also vary.

Various embodiments may further include receiving, sending or storing instructions and/or data that implement the operations described above in conjunction with FIGS. 3–5 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method comprising:
    acquiring a lock on a coherence state entry corresponding to a memory location targeted by a write operation at a node of a multiprocessing computer system;
    retaining an identification of the memory location in a buffer local to the node and separate from the coherence state entry after the write operation completes; and
    in response to an additional write operation requested at the node,
        determining, using at least the identification retained in the buffer, whether one or more global coherence operations are to be invoked for the additional write operation; and
        in response to determining that no global coherence operations are to be invoked, completing the additional write operation at the node without invoking corresponding global coherence operations.

2. The method as recited in claim 1, wherein the node comprises one or more processors, wherein said buffer comprises a register of a processor of the one or more processors that performs the write operation.

3. The method as recited in claim 2, wherein the register is a dedicated register.

4. The method as recited in claim 2, wherein the register is a general purpose register.

5. The method as recited in claim 1, wherein the identification of the memory location includes at least a portion of an address of the memory location.

6. The method as recited in claim 5, wherein said determining whether one or more global coherence operations are to be invoked for the additional write operation comprises:
   determining that the one or more global coherence operations are to be invoked if a target address specified in the additional write operation does not correspond to the at least a portion of an address of the memory location retained in the buffer; and
   determining that no global coherence operations are to be invoked if a target address specified in the additional write operation corresponds to the at least a portion of an address of the memory location retained in the buffer.

7. The method as recited in claim 1, further comprising:
   in response to determining that the one or more global coherence operations are to be invoked, releasing the lock on the coherence state entry.

8. The method as recited in claim 1, further comprising:
   after acquiring the lock, releasing the lock in response to an expiration of a predetermined time period.

9. The method as recited in claim 1, further comprising:
   in response to determining that one or more global coherence operations are to be invoked, invoking the one or more global coherence operations to obtain write permission corresponding to the additional write operation and performing the additional write operation after obtaining the write permission.

10. The method as recited in claim 9, wherein the one or more global coherence operations include transferring a cache line corresponding to an address specified in the additional write operation into the node.

11. The method as recited in claim 10, wherein the one or more global coherence operations further include invalidating copies of the cache line in at least one remote node.

12. The method as recited in claim 11, wherein invaliding the cache line in at least one remote node includes writing a predetermined NAN value to the cache line in at least one remote node.

13. The method as recited in claim 1, wherein the coherence state entry includes an MTAG entry.

14. The method as recited in claim 1, wherein the coherence state entry includes a directory entry.

15. The method as recited in claim 1, wherein the buffer is configured to store a plurality of identifications of memory locations, further comprising:
   retaining at least one other identification of an other memory location corresponding to an other write operation in the buffer concurrently with retaining said identification of said memory location in the buffer.

16. A multiprocessing computer system, comprising:
   a plurality of nodes including a plurality of processors; and
   a storage medium including instructions executable by one or more of the plurality of processors to implement a method comprising:
   acquiring a lock on a coherence state entry corresponding to a memory location targeted by a write operation at a node of the plurality of nodes;
   retaining an identification of the memory location in a buffer local to the node and separate from the coherence state entry after the write operation completes; and
   in response to an additional write operation requested at the node,
      determining, using at least the identification retained in the buffer, whether one or more global coherence operations are to be invoked for the additional write operation; and
      in response to determining that no global coherence operations are to be invoked, completing the additional write operation at the node without invoking corresponding global coherence operations.

17. The multiprocessor computing system as recited in claim 16, wherein said buffer comprises a register of a processor of the plurality of processors that performs the write operation.

18. The multiprocessor computing system as recited in claim 17, wherein the register is a dedicated register.

19. The multiprocessor computing system as recited in claim 17, wherein the register is a general purpose register.

20. The multiprocessor computing system as recited in claim 16, wherein the identification of the memory location includes at least a portion of an address of the memory location.

21. The multiprocessor computing system as recited in claim 20, wherein said determining whether one or more global coherence operations are to be invoked for the additional write operation comprises:
   determining that the one or more global coherence operations are to be invoked if a target address specified in the additional write operation does not correspond to the at least a portion of an address of the memory location retained in the buffer; and
   determining that no global coherence operations are to be invoked if a target address specified in the additional write operation corresponds to the at least a portion of an address of the memory location retained in the buffer.

22. The multiprocessor computing system as recited in claim 16, wherein the method further comprises:
   in response to determining that the one or more global coherence operations are to be invoked, releasing the lock on the coherence state entry and invoking the one or more global coherence operations.

23. The multiprocessor computing system as recited in claim 16, wherein the identification of the memory location corresponds to a cache line most recently written to by a processor at the node.

24. The multiprocessor computing system as recited in claim 16, wherein the method further comprises:
   in response to determining that one or more global coherence operations are to be invoked, invoking the one or more global coherence operations to obtain write permission corresponding to the additional write operation and performing the additional write operation after obtaining the write permission.

25. The multiprocessor computing system as recited in claim 24, wherein the one or more global coherence operations include transferring a cache line corresponding to an address specified in the additional write operation into the node and invalidating a copy of the cache line in at least one remote node.

26. The multiprocessor computing system as recited in claim 25, wherein invaliding the cache line in at least one remote node includes writing a predetermined NAN value to the cache line in at least one remote node.

27. The multiprocessor computing system as recited in claim 16, wherein the node comprises a first processor and a second processor, wherein the buffer is shared by the first processor and the second processor, wherein the first and the second processor are each configured to retain in the buffer respective identifications of memory locations corresponding to write operations performed at the respective processors.

28. The multiprocessor computing system as recited in claim 16, wherein the coherence state entry includes an MTAG entry.

29. The multiprocessor computing system as recited in claim 16, wherein the coherence state entry includes a directory entry.

30. The multiprocessor computing system as recited in claim 16, wherein the buffer is configured to store a plurality of identifications of memory locations, further comprising:
retaining at least one other identification of an other memory location corresponding to an other write operation in the buffer concurrently with retaining said identification of said memory location in the buffer.

31. A tangible, computer readable medium including program instructions computer-executable to implement a method comprising:
acquiring a lock on a coherence state entry corresponding to a memory location targeted by a write operation at a node of a multiprocessing computer system;
retaining an identification of the memory location in a buffer local to the node and separate from the coherence state entry after the write operation completes; and
in response to an additional write operation requested at the node,
determining, using at least the identification retained in the buffer, whether one or more global coherence operations are to be invoked for the additional write operation; and
in response to determining that no global coherence operations are to be invoked, completing the additional write operation at the node without invoking corresponding global coherence operations.

32. The computer readable medium as recited in claim 31, wherein the node comprises one or more processors, wherein said buffer comprises a register of a processor of the one or more processors that performs the write operation.

33. The computer readable medium as recited in claim 31, wherein the identification of the memory location includes at least a portion of an address of the memory location, and, wherein said determining whether one or more global coherence operations are to be invoked for the additional write operation comprises:
determining that the one or more global coherence operations are to be invoked if a target address specified in the additional write operation does not correspond to the at least a portion of an address of the memory location retained in the buffer; and
determining that no global coherence operations are to be invoked if a target address specified in the additional write operation corresponds to the at least a portion of an address of the memory location retained in the buffer.

34. The computer readable medium as recited in claim 31, wherein the method further comprises:
in response to determining that the one or more global coherence operations are to be invoked, releasing the lock on the coherence state entry and invoking the one or more global coherence operations.

35. The computer readable medium as recited in claim 31, wherein the method further comprises:
in response to determining that one or more global coherence operations are to be invoked, invoking the one or more global coherence operations to obtain write permission corresponding to the additional write operation and performing the additional write operation after obtaining the write permission.

36. The computer readable medium as recited in claim 35, wherein the one or more global coherence operations include transferring a cache line corresponding to an address specified in the additional write operation into the node and invalidating a copy of the cache line in at least one remote node.

37. The computer readable medium as recited in claim 36, wherein invaliding the cache line in at least one remote node includes writing a predetermined NAN value to the cache line in at least one remote node.

38. The computer readable medium as recited in claim 31, wherein the method further comprises:
in response to determining that one or more global coherence operations are to be invoked, invoking the one or more global coherence operations, wherein the one or more global coherence operations include sending a consolidated update message to one or more other nodes of the multiprocessing system in accordance with an update-based coherency protocol, wherein the consolidated update message corresponds to a plurality of write operations performed at the memory location.

39. The computer readable medium as recited in claim 31, wherein the coherence state entry includes at least one of: an MTAG entry, and a directory entry.

40. A multiprocessing computer system comprising:
a plurality of nodes including a plurality of processors; and
a storage medium including instructions executable by one or more of the plurality of processors to implement a method for performing write operations in the multiprocessing computer system, the method comprising:
storing an indication of a locked coherence state entry corresponding to a particular address;
determining whether the indication of the locked coherence state entry corresponds to an address of a write operation to be performed;
in response to determining that the indication of the locked coherence state entry corresponds to the address of the write operation to be performed, locally performing the write operation without invoking corresponding global coherence operations; and
in response to determining that the indication of the locked coherence state entry does not correspond to the address of the write operation to be performed, performing global coherence operations to obtain write permission to the address of the write operation to be performed, wherein said global coherence operations include:
transferring a cache line corresponding to the address of the write operation into a local node in which the write operation is to be performed; and
invalidating copies of the cache line in at least one remote node, wherein said invaliding the cache line in at least one remote node includes writing a predetermined NAN value to the cache line in at least one remote node.

* * * * *